3,542,742
**THERMALLY STABLE HETEROCYCLIC NAPHTHA-
LENE POLYMER AND METHOD FOR SYNTHE-
SIZING THE SAME**
Richard L. Van Deusen, Xenia, and Fred E. Arnold,
Dayton, Ohio, assignors to the United States of America as represented by the Secretary of the Air Force
No Drawing. Filed Apr. 3, 1968, Ser. No. 718,375
Int. Cl. C08g 20/32
U.S. Cl. 260—78     5 Claims

ABSTRACT OF THE DISCLOSURE

This invention comprises new thermally stable polymeric compositions and a method for preparing such compositions by the polycondensation reaction of tetrafunctional compounds containing naphthalene nuclei and two or more carboxylic groups capable of reacting with the amino radicals in a tetrafunctional naphthalene compound containing at least two amino radicals. Both the carboxylic radicals and the amino radicals are in peri positions on the naphthalene in order to give six member rings in the resultant ladder-type polymer. All of the carboxylic groups can be in one naphthalene compound such as 1,4,5,8-naphthalene-tetracarboxylic acid, in which case all of the amine groups will be in another naphthalene compound such as 1,4,5,8-naphthalene-tetraamine or alternatively, there can be two carboxylic groups and two amino groups in the same compound such as in 4,5-diamino-1,8-naphthalene-dicarboxylic acid and derivatives. Because of less strain in the resultant six-membered ring structures, the resultant polymers have high thermostability and therefor utility in a variety of aerospace applications, and also are useful for producing molded articles, laminates, films, adhesives and ablative materials.

The invention described herein may be manufactured and used by or for the U.S. Governmental for governmental purpose without paying to us any royalty thereon.

BACKGROUND OF THE INVENTION

Field of the invention

The present invention relates to thermally stable compositions of matter and the methods for synthesizing the same.

The demand for heat-resistant, tractable, nonmetallic materials for aerospace vehicles has existed for some time. Consequently considerable research effort has been spent in recent years on the synthesis of aromatic and heterocyclic polymers to furnish materials for extreme environment applications in such areas as structural composites, ablative composites, adhesives, protective coatings and fibrous materials.

Certain types of polymers which exhibit thermal stabilities in the range of 300–450° C. in air and 500–650° C. in inert atmosphere have demonstrated potential for a variety of such applications.

These polymers indicate that, when used for structural or load-bearing purposes, a candidate material should retain its desirable mechanical properties at elevated temperatures. Materials which should behave better in this manner are the so called "ladder" or double strand polymers as shown in Formula I.

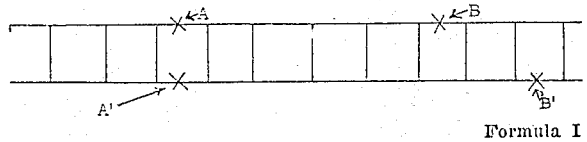

Formula I

In this type of fused ring system, complete scission of the polymer chain requires the cleavage of at least two chemical bonds, that is both sides of a ring such as at points A and A′ within a single unit structure of the chain. Scission at B and B′ will not result in complete scission.

In theory, the probability of two scissions occurring in the same unit or ring structure is relatively low. The possibility also exists that a degraded bond can reform before a second scission takes place in the same unit. Scission at separated locations, that is in separate ring structures is a more probable occurrence, which does not result in complete cleavage of the polymer chain. Based upon these considerations ladder polymer molecules should be expected to exhibit longer life at elevated temperatures.

Some "ladder" polymers have recently appeared in the literature which are synthesized from the polycondensation of aromatic dianhydrides with aromatic tetraamines. Dawans and Marvel, J. Polymer Sci., A3, 3549 (1965) have prepared two such ladder structures by the condensation of 1,4,5,8-tetraaminonaphthalene and 1,2,4,5-tetraaminobenzene with pyromelletic anhydride.

Polymers of one of these types have also been reported by Bell & Pezdirts, J. Polymer Sci. B3, 977 (1965), and by Colson et al., J. Polymer Sci. (A–1), 4, 59 (1966).

One of the present inventors has also published information on ladder polymers derived by the polycondensation of 1,4,5,8-naphthalenetetracarboxylic acid with 3,3′-diaminobenziodine. See Van Deusen, J. Polymer Sci. 4, 211–214 (1966).

The ladder structures, for present purposes will be referred to as those possessing fused 5–6, 6–5 and 5–5 ring systems, the numerical ring designations originating from the respective anhydride and diamine reaction sites of the monomers. These are represented below in Formulas II, II′ and III respectively.

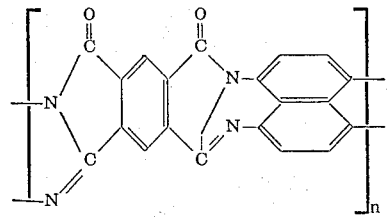

Formula II

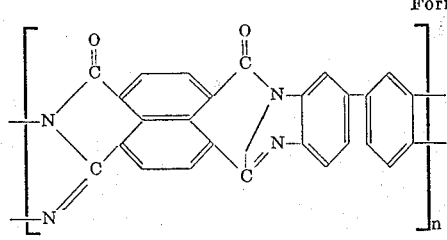

Formula II′

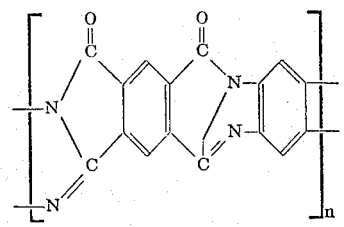

Formula III

SUMMARY OF THE INVENTION

In accordance with the present invention it has now been found that a number of properties, such as thermostability, resistance to radiation, tensile strength and solubility in sulfuric acid are improved in the 6-6 fused ring system of the "ladder" polymers derived from naphthalene compounds having at least one pair of carboxylic function groups in peri position and at least one pair of amino radicals in peri position. The resulting 6-6 fused ring structures are less strained and therefore more thermodynamically stable than 6-5, 5-6, and 5-5 fused ring structures.

In preparing these 6-6 fused ring polymers, the naphthalene can have all four carboxylic groups in one compound such as 1,4,5,8-naphthalene tetracarboxylic acid, in which case it is condensed with a naphthalene compound having four amino groups in peri position such as 1,4,5,8 - tetraaminonaphthalene. Alternatively a single naphthalene compound can be used such as 4,5-tetraaminonaphthalene-1,8-dicarboxylic acid, or derivatives thereof.

The respective resultant polymer structures are shown below in Formulas V and VI.

Regardless of the starting materials, the polymers of this invention have the basic repeating unit shown below in Formula IV.

It will be noted that this basic structure has between the two naphthalene nuclei, two fused rings of six members each.

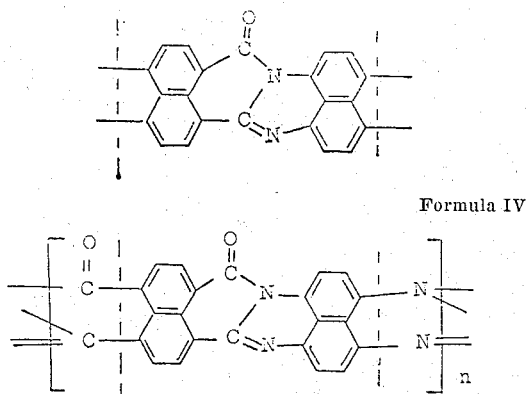

Formula IV

Formula V

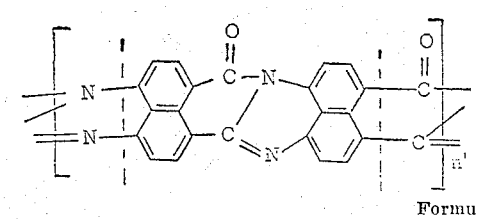

Formula VI

This same polymer can be represented by Formula VI'. In these formulas, $n'$ is an integer having a value of at least one, preferably at least 2, and $n$ is at least 2, preferably at least 4.

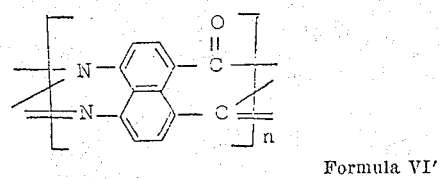

Formula VI'

When the condensation polymer is derived from the reaction of 1,4,5,8-naphthalenetetracarboxylic acid or a derivative thereof, with 1,4,5,8-tetraaminonaphthalene, the repeating unit has the structure shown above in Formula V. In this structure it will be noted that the structure of Formula IV is contained between the two dotted vertical lines imposed on Formula V. Again it will be noted that the two naphthalene nuclei are joined by two fused rings of six members each.

When the polymer is prepared by the self condensation of 4,5-diaamino-1,8-naphthalenedicarboxylic acid, the repeating unit is that shown in Formula VI. Here again, the structure of Formula IV is shown between the two dotted vertical lines superimposed on Formula VI. Likewise the two naphthalene nuclei are joined together by two fused rings of six members each.

In Formula VI, and in Formula VI', the two fused rings are repeated in identical arrangement in each repeating unit. In the polymer of Formula V, the configuration of the two fused rings is identical in alternate positions with the intermediate configurations being mirror images of those in the alternate positions.

In the above formulas, the valencies which are shown unoccupied are attached to hydrogen or can have various other groups substituted thereon, such as R, defined below, and also chlorophenyl, bromophenyl, fluorophenyl, iodophenyl, trifluoromethyl, etc.; and also halogen atoms such as chloro, bromo, iodo, and fluoro; cyano, etc. Advantageously there are no more than 20 carbon atoms in such groups, preferably no more than 10, particularly in the R groups.

R is a hydrocarbon radical, namely alkyl, alkenyl, aryl, alkaryl, aralkyl, cycloalkyl, cycloalkeny, incuding as typical examples methyl, ethyl, propyl, butyl, hexyl, decyl, phenyl, tolyl, naphthyl, methylnaphthyl, ethylnaphthyl, diphenyl, xylyl, cyclohexyl, cyclopentyl, cyclohexenyl, methylcyclohexyl, methylcyclohexenyl, vinyl, allyl, hexenyl, octenyl, ethylphenyl, vinylphenyl, allylphenyl, etc.

Numerous other types of radicals can be present, as previously indicated, provided they do not interfere with the condensation reaction or produce undesirable properties in the resultant polymer. Obviously, the undesirable properties will be determined in accordance with the ultimate use of the polymer. For example, if a derivative group is not capable per se of withstanding high temperatures, the presence of such a group in a polymer ultimately to be used for heat resistance purposes will not be satisfactory. However, for certain other uses where this particular group imparts a desirable property and the ultimate polymer is not to be used where heat resistance is required, then even such groups can be present. It is intended that the scope of the invention include polymers having such a variety of derivative groups. However, for most purposes, the simpler types of structures specifically disclosed herein are preferred. Moreover, while many groups included within the definition, such as acetylenic, spiro, cyclopentadienyl, butadienyl, etc., may be impractical, they are operable and are included in the broad scope of the invention.

One of the starting compounds for preparing the condensation polymers of this invention is a tetracarboxylic naphthalene compound in which the carboxylic groups are in the peri positions of 1,4,5,8 positions.

These can be represented by the Formula VII shown below.

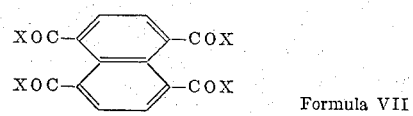

Formula VII

In these formulas, X represents OH, Cl, Br, I OR and two X's in adjacent —COX groups can together represent divalent —O—, so as to form a carboxylic anhydride group. R is a hydrocarbon group as illustrated below.

With such tetracarboxylic compounds, there are reacted the tetraaminonaphthalene compounds represented by Formula VIII.

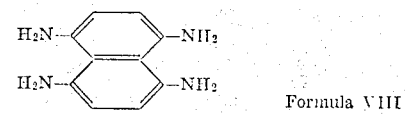

Formula VIII

In Formula VIII the NH₂ groups can be in any associated or derivative form, such as the hydrochloride, in which it can be reacted with the COX groups of Formula VII.

Also as explained above, the same basic fused ring structure of Formula IV, in slightly different arrangement from that of Formula V, can be obtained by self-condensation of 4,5-diaminonaphthalene-1,8-dicarboxylic compounds as represented by Formula IX.

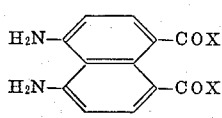

Formula IX

The comments made above with regard to COX, NH$_2$ and the other substituent groups on the naphthalene nucleus also apply here.

Depending on the starting materials, the reaction conditions and the processing conditions, the terminal groups in these polymers will vary accordingly. However, for the purpose of this invention, these terminal groups are considered as equivalent to each other and the exact structure or form is not considered critical. In most cases, they will comprise nonreacted functional groups of the starting compounds. In most cases they will be the corresponding functional groups modified or changed according to the reagents or processing conditions encountered. Thus when the starting monomer is of Formula IX, the terminal groups will be NH$_2$ at one end and COX at the other end, or derivative groups respectively. When a combination of monomers VII and VIII are used, the terminal groups can be NH$_2$ at one end and COX at the other, or NH$_2$ at both ends or COX at both ends, depending on which starting compound is used in excess, or again they may be derivatives of the respective groups.

When the starting compounds are not fully condensed in the resulting polymers, there may be some pendant groups instead of the two cyclic rings between the naphthalene nuclei. For example such intermediate structures are possible as:

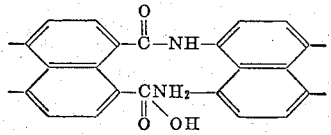

and

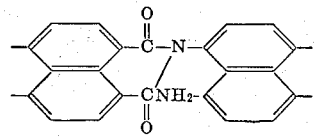

or

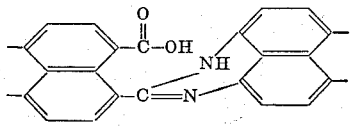

However, by the time the polymer has progressed to the degree described therein to attain its heat stable properties, the polymer has progressed to a substantial portion of the completed double cyclic structure of Formula V or VI.

Because of the instability of 1,4,5,8-tetraaminonaphthalene upon isolation, the compound is used directly in the solution in which it is prepared, or is used in the form of a derivative, such as the tetrahydrochloride. Thus, 1,4,5,8-tetranitronaphthalene can be reduced catalytically in diglyme (bis-2-methoxy-ethyl ether) and the resultant tetraaminonaphthalene solution used directly, advantageously after filtration, by the addition of an equimolar amount of naphthalene tetracarboxylic acid dianhydride.

If an anhydride starting material is used, an organic solvent, such as diglyme, is desirable. If the free acid is used, a solvent such as polyphosphoric acid is advantageous. Thus the polycondensation can be conducted directly, or in diglyme solution or in polyphosphoric acid solution, or in any other appropriate solvent.

The 4,5-diaminonaphthalene-1,8-dicarboxylic acid or its anhydride can be prepared by the reduction of 4,5-dinitronaphthalene-1,8-dicarboxylic acid or its anhydride. The resultant compound can be condensed to give polymers of this invention by solution polymerization in polyphosphoric acid, diglyme or other suitable solvent.

In effecting the polycondensation, temperatures of at least 100° C., advantageously 130°–220° C., preferably 180°–220° C., are necessary. Other conditions favoring removal of condensation byproducts are also advantageous.

The polymers of this invention are characterized by infrared spectra and elementary analyses. Infrared and elementary analyses indicate that these polymers are cyclized substantially to 6-6 fused ring systems, the degree of cyclization depending somewhat on the purity of the starting materials as well as the sufficiency of the reaction conditions.

These polymers are bluish-black solids which when soluble produce deep red solutions in concentrated sulfuric acid. Thermograms of typical polymers show breaks at 450° C. or higher in an atmosphere of air while in a nitrogen atmosphere the break occurs at 600° C. or higher.

The polymers obtained from 4,5-diaminonaphthalene-1,8-dicarboxylic acid anhydride are generally insoluble whereas those from the corresponding dimethyl ester are of low molecular weight and soluble in sulfuric acid as are the polymers obtained by the condensation of the dianhydride with the tetraamine compound. The polymers are insoluble in common organic solvents so that they cannot be characterized by conventional methods. However, generally thermograms show a major break at 450° C. or higher in air while in a nitrogen atmosphere the break occurs at 600° C. or higher.

In using the polymers of this invention for the various aerospace, molding, laminate or coating applications, etc. for which these polymers are useful, the polymers can be processed, shaped or dissolved at an intermediate state and after application in its desired position or shape the solvent can be removed by evaporation, or the polymer precipitated by addition to a non-solvent such as in spinning fibers or can be hardened by heat curing, etc. The techniques are similar to those presently used in similar applications and are familiar to those skilled in the art. In many cases the polymers are soluble in sulfuric acid and fibers of heat resistant properties can be spun from such solutions.

DESCRIPTION OF PREFERRED EMBODIMENTS

The practice of this invention is best illustrated by the following examples. These examples are given merely by way of illustration and are not intended to limit in any way the scope of the invention nor the manner in which it may be practiced. Unless specifically indicated otherwise, parts and percentages are given as parts and percentages by weight.

Example I 1,4,5,8-tetraaminonaphthalene is prepared by catalytic reduction of 1.169 parts of 1,4,5,8-tetranitronaphthalene using 200 parts of palladium catalyst on charcoal in 30 parts of diglyme, the resultant suspension being shaken with hydrogen under a pressure of 50 p.s.i. at 50° C. for 48 hours. The reaction mixture is then filtered under an inert atmosphere and the filtrate added to a solution of 1.017 parts of 1,4,5,8-naphthalenetetracarboxylic anhydride suspended in 30 parts of diglyme. The resultant solution is then heated at 180° C. for 15 hours and diglyme is removed under pressure. Following this, the dark blue residue is heated at 350° C. under reduced pressure for 4 hours. The resulting polymer has an inherent viscosity of 0.15 dl./gm. in concentrated sulfuric acid (0.3 gram/ 100 ml. at 30° C.) Analyses for carbon, hydrogen, and nitrogen give results corresponding closely to those calculated for a polymer having the repeating unit of Formula VI shown above.

Example II

To a three-neck glass flask fitted with stirrer and nitrogen inlet and outlet, there is added 100 parts of polyphosphoric acid. The flask is heated to 100° C. under reduced pressure to expel air and is cooled at room temperature under nitrogen. With a very slow stream of nitrogen passing through the flask, 5 parts of dimethyl-4,5-diaminonaphthalene-1,8-dicarboxylate is added and the mixture slowly heated to 200° C. This reaction mixture is maintained under 200° C. for 4 hours, then cooled to 100° C. and poured into 4000 parts of distilled water to precipitate the polymer. The dark blue precipitate is dissolved in concentrated sulfuric acid and then reprecipitated in distilled water. The product represents a yield of 94% and has an inherent viscosity of 0.25 dl./gm. in concentrated sulfuric acid (0.3 g./100 ml. at 30° C.). The analyses for carbon, nitrogen, and hydrogen correspond very closely to those calculated for a polymer having the repeating unit structure of Formula VI. This procedure is repeated a number of times with similar results using individually the diethyl, diamyl, diphenyl and dicyclohexyl esters in equivalent amount to and in place of the dimethyl ester.

Example III 4,5-diaminonaphthalene-1,8-dicarboxylic anhydride is prepared by adding 5 parts of 4,5-dinitronaphthalene-1,8-dicarboxylic anhydride as a solid in increments and under a nitrogen atmosphere to a solution of 40 parts of stannous chloride dihydrate in 60 parts of 27% hydrochloric acid. The reaction mixture is maintained below 60° C. for 4 hours, and then allowed to cool to room temperature. The resulting yellow material is collected by filtration and washed with a 5% sodium carbonate solution and recrystallized from a 95% aqueous methanol solution to give a 59% yield of the diamino-anhydride compound having a melting point of 400° C. The melting point of 400° C. agrees with that reported in the literature and the carbon, nitrogen, hydrogen analyses correspond very closely to those calculated.

Five parts of this material is added under a nitrogen atmosphere to 100 parts of deoxygenated polyphosphoric acid. The mixture is slowly heated to 200° C. and maintained at the temperature for 4 hours. Then the mixture is cooled to 60° C., poured into 4000 parts of distilled water upon which a brown solid is precipitated which is not soluble in concentrated sulfuric acid. Analyses for carbon, nitrogen, hydrogen give results checking with those calculated for a polymer having the repeating units shown above in Formula VI.

Example IV

The procedure of Example I is repeated a number of times with similar results using individually in place of the tetra-acid used there an equivalent weight of the anhydride of the following tetra-acids respectively:

2-Me-1,4,5,8-naphthalenetetracarboxylic acid
2,6-di-Me-1,4,5,8-naphthalenetetracarboxylic acid
2-Cl-1,4,5,8-naphthalenetetracarboxylic acid
2-Br-1,4,5,8-naphthalenetetracarboxylic acid
2-CN-1,4,5,8-naphthalenetetracarboxylic acid
2-F-1,4,5,8-naphthalenetetracarboxylic acid
2-phenyl-1,4,5,8-naphthalenetetracarboxylic acid
2-cyclohexyl-naphthalenetetracarboxylic acid

Example V

The procedure of Example I is repeated a number of times with similar results using individually in place of the tetraamine used there an equivalent amount of the following tetra-amines respectively:

2-Me-1,4,5,8-tetraaminonaphthalene
2,6-di-Me-1,4,5,8-tetraaminonaphthalene
2-Cl-1,4,5,8-tetraaminonaphthalene
2-Br-1,4,5,8-tetraaminonaphthalene
2-CN-1,4,5,8-tetraaminonaphthalene
2-F-1,4,5,8-tetraaminonaphthalene
2-phenyl-1,4,5,8-tetraaminonaphthalene
2-cyclohexyl-1,4,5,8-tetraaminonaphthalene

Example VI

The procedure of Example III is repeated a number of times with similar results using individually in place of the naphthalene compound of that example an equivalent amount of the following compounds respectively:

2-Me-4,5-diaminonaphthalene-1,8-dicarboxylic anhydride
2-Cl-4,5-diaminonaphthalene-1,8-dicarboxylic anhydride
2-Br-4,5-diaminonaphthalene-1,8-dicarboxylic anhydride
2-benzyl-4,5-diaminonaphthalene-1,8-dicarboxylic anhydride While the various naphthalene acids in the above examples are used in either the anhydride or ester form, it is possible also to use the free acid, acid halide, etc., with appropriate modification in conditions for the corresponding functional groups.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

We claim:
1. A fiber-forming, heat stable polymer having a plurality of repeating units consisting of:

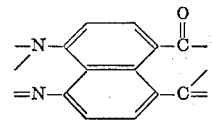

in which the naphthalene nuclei in the repeating units have the valencies at positions other than the peri positions attached only to radicals selected from the class consisting of hydrogen, chlorine, bromine, fluorine, iodine, cyanide and hydrocarbon radical of no more than 10 carbon atoms, no more than 2 of said other positions being occupied by a radical other than hydrogen.

2. The polymer of claim 1 in which all of said other positions are occupied by hydrogen.

3. The process of preparing a fiber-forming, heat stable polymeric composition of claim 1 comprising the steps of heating a naphthalene compound having the formula:

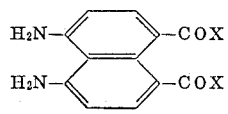

at a temperature of 100–200° C. for a period of at least 2 hours and recovering the polymeric product, said naphthalene compound having the valencies at positions other than the peri positions attached only to radicals selected from the class consisting of hydrogen, chlorine, bromine, fluorine, iodine, cyanide and hydrocarbon radical of no more than 10 carbon atoms, no more than 2 of said other positions in a naphthalene nucleus being occupied by a radical other than hydrogen, X represents a radical selected from the class consisting of OH, Cl, Br, I, OR, and two X's in adjacent COX groups represent divalent —O—, and R is a hydrocarbon group of no more than 10 carbons.

4. The process of claim 3 in which said heating is effected in polyphosphoric acid.

5. The process of claim 4 in which all of said other positions on said naphthalene nuclei are attached to hydrogen.

References Cited

UNITED STATES PATENTS 3,414,543  12/1968  Paufler _____ 260—47
3,435,004  3/1969  Hathaway et al. _____ 260—65

HAROLD D. ANDERSON, Primary Examiner

H. SCHAIN, Assistant Examiner

U.S. Cl. X.R.

161—227